US012812721B2

(12) United States Patent
Si et al.

(10) Patent No.: US 12,812,721 B2
(45) Date of Patent: Nov. 24, 2026

(54) POSITIONING METHOD AND TERMINAL

(71) Applicant: VIVO MOBILE COMMUNICATION CO., LTD., Dongguan (CN)

(72) Inventors: Ye Si, Dongguan (CN); Yuanyuan Wang, Dongguan (CN); Xiang Pan, Dongguan (CN); Hongping Zhang, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 207 days.

(21) Appl. No.: 18/605,046

(22) Filed: Mar. 14, 2024

(65) Prior Publication Data

US 2024/0224222 A1 Jul. 4, 2024

Related U.S. Application Data

(63) Continuation of application No. PCT/CN2022/118408, filed on Sep. 13, 2022.

(30) Foreign Application Priority Data

Sep. 15, 2021 (CN) ......................... 202111081993.6

(51) Int. Cl.
*H04W 76/20* (2018.01)
*H04L 5/00* (2006.01)
(Continued)

(52) U.S. Cl.
CPC ........... *H04W 76/20* (2018.02); *H04L 5/0051* (2013.01); *H04W 36/08* (2013.01);
(Continued)

(58) Field of Classification Search
CPC .. H04L 25/0226; H04L 5/0051; H04W 64/00; H04W 74/0833; H04W 48/12; H04W 72/535
(Continued)

(56) References Cited

U.S. PATENT DOCUMENTS 11,125,849 B2 9/2021 Shi et al.
2016/0050534 A1 2/2016 Lim et al.
(Continued)

FOREIGN PATENT DOCUMENTS

CN 110022523 A 7/2019
CN 111865388 A 10/2020
(Continued)

OTHER PUBLICATIONS

Huawei et al., "Discussion on Idle and Inactive positioning", 3GPP TSG-RAN WG2 Meeting #113-e, Electronic, Jan. 25-Feb. 5, 2021, R2-2101225.
(Continued)

*Primary Examiner* — Khai Tran
(74) *Attorney, Agent, or Firm* — The Webb Law Firm

(57) ABSTRACT

A positioning method includes in a case that a terminal completes cell reselection or camped cell handover during sending of an uplink reference signal in an idle state or an inactive state, performing, by the terminal, a first behavior, where the first behavior is related to the sending, releasing, or updating of the uplink reference signal, and the uplink reference signal comprises an uplink positioning reference signal and/or an uplink sensing signal.

20 Claims, 4 Drawing Sheets

200

(51) Int. Cl.
*H04W 36/08* (2009.01)
*H04W 56/00* (2009.01)
*H04W 64/00* (2009.01)
*H04W 74/0833* (2024.01)

(52) U.S. Cl.
CPC ....... *H04W 56/0045* (2013.01); *H04W 64/00* (2013.01); *H04W 74/0833* (2013.01)

(58) Field of Classification Search
USPC .......................................................... 455/456
See application file for complete search history.

(56) References Cited

U.S. PATENT DOCUMENTS

| | | | | |
|---|---|---|---|---|
| 2021/0176095 | A1 | 6/2021 | Manolakos et al. | |
| 2021/0235475 | A1* | 7/2021 | Ingale | H04W 72/0453 |
| 2022/0046716 | A1 | 2/2022 | Chai et al. | |
| 2023/0031065 | A1* | 2/2023 | Manolakos | H04W 64/00 |
| 2023/0164732 | A1* | 5/2023 | Lee | H04L 5/0053<br>455/456.1 |
| 2023/0247582 | A1 | 8/2023 | Li | |

FOREIGN PATENT DOCUMENTS

| | | | |
|---|---|---|---|
| CN | 111972016 | A | 11/2020 |
| CN | 113329322 | A | 8/2021 |
| CN | 113383585 | A | 9/2021 |
| WO | 2013137645 | A1 | 9/2013 |
| WO | 2019183815 | A1 | 10/2019 |

OTHER PUBLICATIONS

Huawei et al., "Way-forward for Inactive Positioning", 3GPP TSG-RAN WG2 Meeting #115-e, Electronic, Aug. 9-27, 2021, R2-2108605.
Mediatek, "Report from session on positioning and sidelink relay", 3GPP TSG-RAN WG2 Meeting #115 electronic, Online, Aug. 16-27, 2021, R2-2108835.
Samsung, "Positioning in RRC inactive state", 3GPP TSG-RAN3 Meeting #112-e, Electronic meeting, May 17-27, 2021, R3-211983.

* cited by examiner

POSITIONING METHOD AND TERMINAL

CROSS-REFERENCE TO RELATED APPLICATIONS

The application is a Bypass Continuation Application of International Patent Application No. PCT/CN2022/118408, filed Sep. 13, 2022, and claims priority to Chinese patent application Ser. No. 20/211,1081993.6, filed Sep. 15, 2021, the disclosures of which are hereby incorporated by reference in their entireties.

BACKGROUND OF THE INVENTION

Field of the Invention

This application relates to the field of communications technologies, and specifically, relates to a positioning method and a terminal.

Description of Related Art

With development of communications technologies, various applications based on positioning functions have emerged. Application programs such as a map application, a take-out application, and a shopping application all need to obtain location information of terminals.

However, considering that a positioning function is a major energy consumer in a terminal (User Equipment, UE, which may also be referred to as a terminal device or user equipment), high energy consumption of the terminal in a positioning process has become an urgent problem to be resolved in the field.

SUMMARY OF THE INVENTION

Embodiments of this application provide a positioning method and apparatus.

According to a first aspect, a positioning method is provided and includes: sending, by a terminal, an uplink reference signal in an idle state or an inactive state, where the uplink reference signal includes an uplink positioning reference signal and/or an uplink sensing signal; and receiving, by the terminal based on a first time window, target feedback information sent by a network-side device, and/or monitoring, by the terminal based on a first time window, a first physical downlink control channel (PDCCH), where the target feedback information is carried in the first PDCCH, and/or the target feedback information is carried in a physical downlink shared channel (PDSCH) scheduled by the first PDCCH.

According to a second aspect, a positioning method is provided and includes: in a case that a terminal completes cell reselection or camped cell handover during sending of an uplink reference signal in an idle state or an inactive state, performing, by the terminal, a first behavior, where the first behavior is related to the sending, releasing, or updating of the uplink reference signal, and the uplink reference signal includes an uplink positioning reference signal and/or an uplink sensing signal.

According to a third aspect, a positioning apparatus is provided and applied to a terminal. The apparatus includes: a transmission module, configured to send an uplink reference signal in an idle state or an inactive state, where the uplink reference signal includes an uplink positioning reference signal and/or an uplink sensing signal; and a first execution module, configured to receive, based on a first time window, target feedback information sent by a network-side device, and/or monitor, based on a first time window, a first PDCCH, where the target feedback information is carried in the first PDCCH, and/or the target feedback information is carried in a PDSCH scheduled by the first PDCCH.

According to a fourth aspect, a positioning apparatus is provided and applied to a terminal. The apparatus includes: a second execution module, configured to perform a first behavior in a case that the terminal completes cell reselection or camped cell handover during sending of an uplink reference signal in an idle state or an inactive state, where the first behavior is related to the sending, releasing, or updating of the uplink reference signal, and the uplink reference signal includes an uplink positioning reference signal and/or an uplink sensing signal.

According to a fifth aspect, a terminal is provided. The terminal includes a processor, a memory, and a program or instructions that are stored in the memory and executable on the processor. When the program or instructions are executed by the processor, the steps of the method according to the first aspect or the second aspect are implemented.

According to a sixth aspect, a terminal is provided. The terminal includes a processor and a communication interface. The communication interface is coupled to the processor. The processor is configured to execute a program or instructions to implement the steps of the method according to the first aspect or the second aspect.

According to a seventh aspect, a non-transitory readable storage medium is provided. The non-transitory readable storage medium stores a program or instructions. When the program or instructions are executed by a processor, the steps of the method according to the first aspect or the second aspect are implemented.

According to an eighth aspect, a chip is provided. The chip includes a processor and a communication interface. The communication interface is coupled to the processor. The processor is configured to execute a program or instructions to implement the steps of the method according to the first aspect or the second aspect.

According to a ninth aspect, a computer program or program product is provided. The computer program or program product is stored in a storage medium. The program or program product is executed by at least one processor to implement the steps of the method according to the first aspect or the second aspect.

DESCRIPTION OF THE INVENTION

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specified order or sequence. It should be understood that the terms used in this way are interchangeable in appropriate circumstances, so that the embodiments of this application can be implemented in other orders than the order illustrated or described herein. In addition, objects distinguished by "first" and "second" usually fall within one class, and a quantity of objects is not limited. For example, there may be one or more first objects. In addition, the term "and/or" in the specification and claims indicates at least one of connected objects, and the character "/" generally represents an "or" relationship between associated objects.

It should be noted that technologies described in the embodiments of this application are not limited to a long term evolution (LTE)/LTE-Advanced (LTE-A) system, and can also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. The described technologies may be used for the foregoing systems and radio technologies, and may also be used for other systems and radio technologies. However, in the following descriptions, the new radio (NR) system is described for an illustrative purpose, and NR terms are used in most of the following descriptions. These technologies may also be applied to other applications than an NR system application, for example, a 6-th Generation (6G) communications system.

Figure 1:
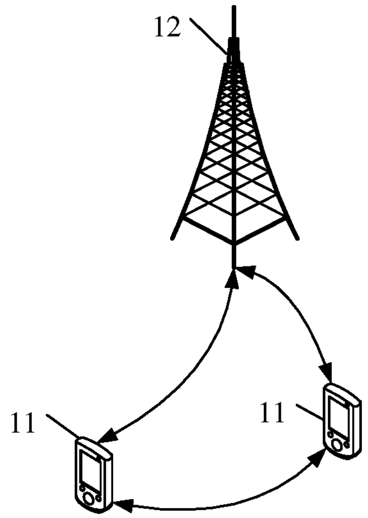
FIG. 1 is a schematic structural diagram of a wireless communications system according to an exemplary embodiment of this application.

FIG. 1 is a schematic structural diagram of a wireless communications system to which an embodiment of this application may be applied. The wireless communications system includes a terminal 11 and a network-side device 12. The terminal 11 may be a terminal-side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device, a vehicular device (VUE), or a pedestrian terminal (PUE). The wearable device includes a smartwatch, a smart band, a headphone, glasses, or the like. It should be noted that a specific type of the terminal 11 is not limited in the embodiments of this application. The network-side device 12 may be a base station or a core network device. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception point (TRP), or another appropriate term in the art, as long as the same technical effect is achieved. The base station is not limited to specific technical terms. It should be noted that in the embodiments of this application, only a base station in an NR system is used as an example, but a specific type of the base station is not limited. The core network device may be a location management function (LMF) or another node.

The technical solutions provided in the embodiments of this application are hereinafter described in detail by using some embodiments and application scenarios thereof with reference to the accompanying drawings.

Figure 2:
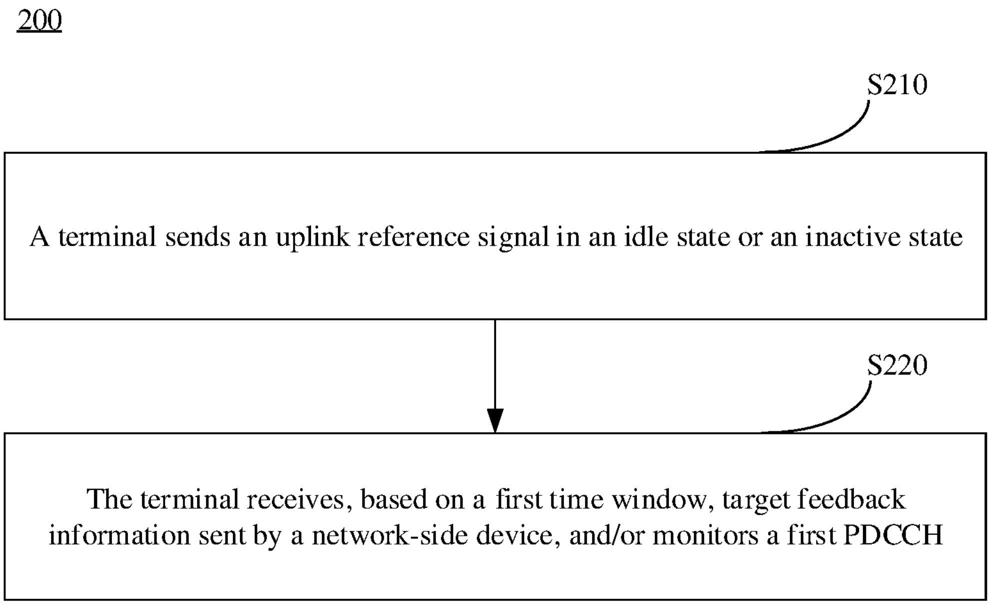
FIG. 2 is a schematic flowchart of a positioning method according to an exemplary embodiment of this application.

FIG. 2 is a schematic flowchart of a positioning method 200 according to an exemplary embodiment of this application. The method 200 may be performed by a terminal, but this is not limited. The method 200 may be performed by hardware and/or software installed in the terminal. In this embodiment, the method 200 may include at least the following steps.

S210. A terminal sends an uplink reference signal in an idle state or an inactive state.

The uplink reference signal (RS) includes an uplink positioning reference signal and/or an uplink sensing signal. The uplink positioning reference signal is used for positioning measurement, and may include but is not limited to a sounding reference signal (SRS), a random access signal, an uplink demodulation reference signal, other reference signals for uplink positioning, or the like. The SRS may include an SRS for positioning, an SRS for multiple-input multiple-output (MIMO), or the like. The uplink sensing signal is used by the terminal to sense/detect a channel, sense/detect its surrounding environment, sense/detect its geographical environment, or implement other sensing/detection functions, or the like.

It may be understood that in addition to being used for positioning and sensing, the uplink reference signal mentioned in this application can also be used by a network-side device to perform other functions such as channel measurement, estimation, and channel state information (CSI) acquisition.

The terminal is in the idle state or the inactive state. In other words, this application uses characteristics of low energy consumption in the idle state or inactive state to implement a terminal positioning function. This can effectively alleviate a possible problem of high energy consumption of the terminal in a positioning process while ensuring positioning performance.

S220. The terminal receives, based on a first time window, target feedback information sent by the network-side device, and/or monitors a first PDCCH.

The target feedback information is carried in the first PDCCH, and/or the target feedback information is carried in a PDSCH scheduled by the first PDCCH. The target feedback information corresponds to the uplink reference signal. For example, in a case that the uplink reference signal is an uplink positioning reference signal, the target feedback information may be positioning feedback information or the like.

The first time window may also be understood as a timer. In this application, the target feedback information (such as uplink reference signal configuration update information or timing advance (TA) update information) is monitored based on the first time window. This can better maintain validity and reliability of a TA and/or a configuration of the uplink reference signal. It may be understood that the TA means that a system frame in which the terminal sends uplink data is some time earlier than a corresponding downlink frame.

The TA can be obtained through calculation by a base station based on a random access preamble sent by the terminal, and notified to the terminal by using a TA command.

In this embodiment, starting or closing of the first time window may be determined based on demand, or may be implemented in this manner: prescribed in a protocol, configured by a network, configured by a higher layer, or the like. This is not limited herein.

Based on this, when the terminal receives the target feedback information based on the first time window, the target feedback information may be carried in the first PDCCH, and/or the target feedback information is carried in the PDSCH, where the PDSCH is scheduled by the first PDCCH.

It should be noted that a target configuration associated with the first PDCCH and used for receiving the target feedback information may include at least one of the following: a configuration of the first time window, such as a start point, an end point, a length, or a period of the time window; a configuration of a search space (SS) associated with the first PDCCH; a configuration of a control resource set (CORESET) associated with the first PDCCH; or a configuration of a radio network temporary identifier (RNTI) associated with the first PDCCH.

Based on this, in an implementation, the target configuration may be a dedicated configuration dedicated to receiving the target feedback information, or may be a shared configuration for receiving the target feedback information and/or other information than the target feedback information. In other words, in addition to the dedicated configuration, the target configuration may be a configuration for reusing or sharing a paging frame, a paging occasion (PO), an SS configuration, or a CORESET of a paging PDCCH. Optionally, the target configuration may alternatively be a terminal-specific configuration or a common configuration (such as a cell common configuration or a geographical common configuration).

It may be understood that, assuming that the target configuration is a configuration of an RNTI for reusing or sharing the paging PDCCH, an RNTI (for example, a C-RNTI) is allocated in a radio resource control (RRC) release message to the terminal in the idle state or inactive state, and the terminal can monitor this RNTI and a P-RNTI on a PO at the same time. In other words, the terminal can monitor the paging PDCCH and the first PDCCH at the same time after waking up, thereby achieving an effect of power saving. Another example is to share the configuration with a paging message, that is, the target configuration is carried in the paging PDCCH and/or the PDSCH.

In addition, the target configuration may be implemented in this manner: prescribed in a protocol, configured by a higher layer, configured by the network, or the like. In addition, the target configuration may be sent together with the configuration of the uplink reference signal to the terminal, or included in the configuration of the uplink reference signal, for example, in an RRC release message. Alternatively, the target configuration may be sent to the terminal in a broadcast manner (for example, included in a system information block (SIB) 1 or another SIB).

Optionally, before sending the uplink reference signal, the terminal may monitor, within a specific periodic monitoring occasion, a second PDCCH for scheduling an updated uplink reference signal configuration and/or TA configuration, so that the terminal can send the uplink reference signal based on the updated uplink reference signal configuration and/or TA configuration.

In this embodiment, similarly to the first PDCCH, a target configuration associated with the second PDCCH may include an SS configuration, a CORESET configuration, an RNTI configuration, and the like. In addition, these target configurations may be UE specific configurations or common configurations (such as cell specific). Optionally, these configurations may be dedicated configurations of updated uplink reference signal configurations and/or TA configurations, or configurations shared with other information.

Optionally, configuration information of a system frame, a subframe, a slot, or a symbol in which the second PDCCH is located, an SS configuration, a CORESET configuration, an RNTI configuration, and the like may be obtained in at least one manner: indicated by the network or prescribed in a protocol.

It should be noted that when the target configuration includes the RNTI configuration, the RNTI configuration is different from the P-RNTI. In addition, an RNTI associated with the second PDCCH and/or other configurations not reused with the paging PDCCH may be dedicated to monitoring the PDCCH.

In an implementation, the target configuration may be implemented in this manner: indicated by the network, prescribed in a protocol, configured by a higher layer, or the like. For example, when indicated by the network, the target configuration may be sent to the terminal together with the configuration of the uplink reference signal, or may be included in the configuration of the uplink reference signal.

In an implementation process of the positioning method, to prevent the terminal from frequently initiating small data transmission (SDT) or entering a connected state and further leading to a problem of high energy consumption of the terminal because the terminal frequently initiates cell reselection or camped cell handover when cells are densely deployed and/or the terminal has mobility, this application can extend an effective area of the uplink reference signal to a plurality of cells, thereby reducing behaviors of frequently initiating SDT or entering the connected state by the terminal.

For example, before performing step S210, the terminal may receive cell list information sent by the network-side device. The cell list information may include information about at least one first cell to assist in sending the uplink reference signal when the terminal moves in the at least one first cell, or to indicate that the configuration of the uplink reference signal is valid in each first cell included in the cell list, thereby extending the effective area of the uplink reference signal.

In an implementation, the cell list information includes at least one of the following (21) to (27).

(21) Identification information of each first cell, used to identify each first cell. Optionally, the identification information may include but is not limited to a physical cell identifier (PCI), an NR cell global identifier (NCGI), an absolute radio frequency channel number (ARFCN) of a cell, or other cell identifiers that can be used to identify a cell.

(22) Related time information of each first cell. Optionally, the related time information includes but is not limited to an absolute time of system frame number (SFN) 0, an SFN0-offset, an expected-reference signal time difference (expected-RSTD), expected RSTD uncertain, and the like.

Based on this, in an implementation, the cell list information may further include indication information of a reference cell. The reference cell is used to instruct the terminal to use the related time information SFN0-offset, expected-RSTD, expected-RSTD uncertain, or the like.

In this embodiment, the reference cell may be a cell that sends the RRC release message or other designated cells.

Optionally, the cell list information may further include the cell that sends the RRC release message.

(23) Configuration information of a target reference signal of each first cell. The target reference signal of the first cell is used by the terminal to calculate an RSTD or a reference signal received power (RSRP) difference, or the like. Optionally, the configuration of the target reference signal may include but is not limited to time domain position information (such as an RS period, a period offset, and a quantity of symbols) of the RS, frequency domain position information (such as a subcarrier spacing (SCS), a bandwidth, a start PRB position, a center frequency, and a comb structure) of the RS, a time-frequency pattern of the RS, a sequence identifier of the RS, and the like.

(24) A threshold for an RSTD between the first cells. Optionally, the RSTD threshold may be a threshold for an RSTD between neighboring first cells. In this case, an implementation of indicating whether the first cell is neighboring may be: when the network-side device indicates an identity (ID) of a cell, the network-side device may also indicate identification information of at least one neighboring cell neighboring to the cell.

(25) A threshold for an RSRP difference between the first cells. Optionally, similarly to the RSTD, the threshold for the RSRP difference may also be a threshold for an RSRP difference between neighboring first cells. In this case, an implementation of indicating whether the first cell is neighboring may be: when the network-side device indicates an ID of a cell, the network-side device may also indicate identification information of at least one neighboring cell neighboring to the cell.

(26) A TA-related parameter of each first cell. The TA-related parameter may include but is not limited to a cell timing advance offset ($N_{TA\ offset}$) a TA validity parameter value, or the like.

Optionally, the TA validity parameter may include an RSRP change threshold, a parameter of a time alignment timer, RS configuration information used to calculate RSRP, or the like.

(27) Information about a second cell, where the second cell is a cell that is in the at least one first cell and capable of allowing a terminal camping on the second cell to send an uplink reference signal without receiving sixth information, and the sixth information is a TA command and/or a TA validity parameter of the second cell.

In other words, the second cell does not allow the terminal, after the terminal selects the cell through cell reselection or after the terminal is handed over to the cell through camped cell handover, to send an uplink reference signal (or an uplink signal other than a physical random access channel (PRACH)) without receiving the TA command and/or the TA validity parameter of the second cell. Alternatively, the second cell does not allow the terminal, after the terminal selects the cell through cell reselection or after the terminal is handed over to the cell through camped cell handover, to autonomously determine whether a previous TA is valid and to send an uplink reference signal (or an uplink signal other than a PRACH). Alternatively, the second cell does not allow the terminal, after the terminal selects the cell through cell reselection or after the terminal is handed over to the cell through camped cell handover, to send an uplink reference signal (or an uplink signal other than a PRACH) before receiving the TA command and/or the TA validity parameter.

In an implementation, the information about the second cell may be included in information about a cell ID group in which the second cell is located, or carried in a cell information list associated with each first cell and indicated by one bit.

In this embodiment, the terminal sends the uplink reference signal in the idle state or the inactive state. Therefore, a problem of high energy consumption of the terminal due to terminal positioning can be effectively alleviated. In addition, the terminal receives, based on the first time window, the target feedback information sent by the network-side device, and/or monitors the first PDCCH related to the target feedback information, so that the terminal can maintain validity of the TA or validity of the configuration of the uplink reference signal in the positioning process, thereby further ensuring positioning/sensing performance.

Figure 3:
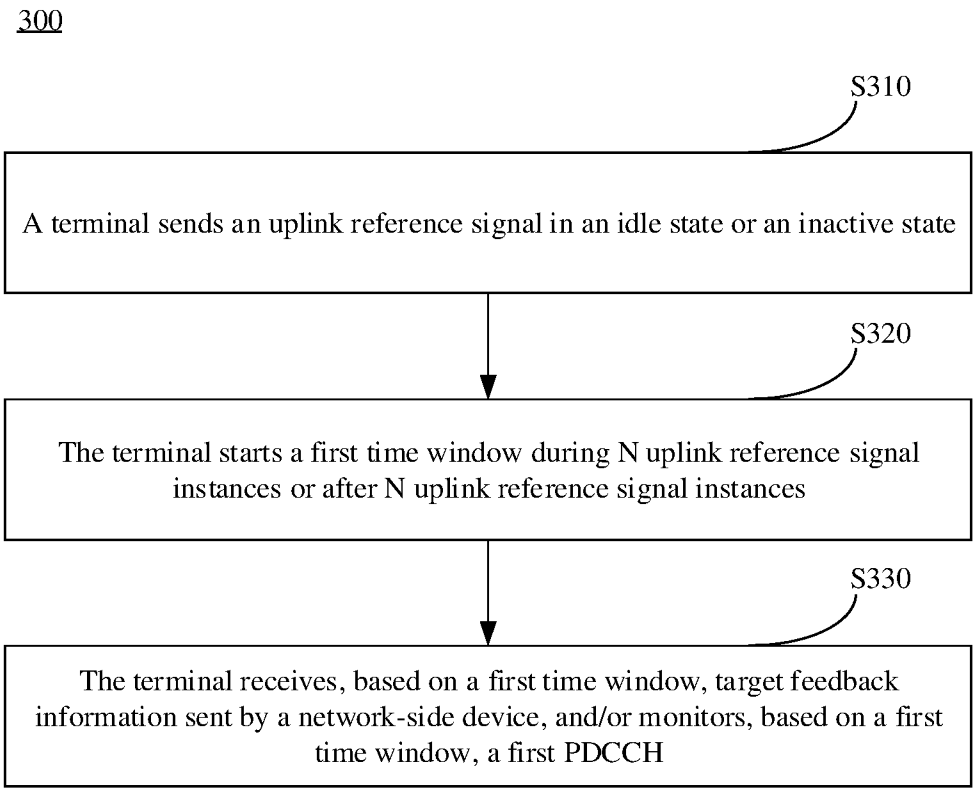
FIG. 3 is a schematic flowchart of a positioning method according to another exemplary embodiment of this application.

FIG. 3 is a schematic flowchart of a positioning method 300 according to an exemplary embodiment of this application. The method 300 may be performed by a terminal, but this is not limited. The method 300 may be performed by hardware and/or software installed in the terminal. In this embodiment, the method 300 may include at least the following steps.

S310. A terminal sends an uplink reference signal in an idle state or an inactive state.

The uplink reference signal includes an uplink positioning reference signal and/or an uplink sensing signal.

It may be understood that, for an implementation process of S310, reference may be made to the related description in the method embodiment 200. To avoid repetition, details are not described herein again.

S320. The terminal starts a first time window during N uplink reference signal instances or after N uplink reference signal instances.

The uplink reference signal instance is used to transmit the uplink reference signal, and N is an integer greater than or equal to 1. Optionally, the uplink reference signal instance may be understood as an occasion, a burst, a period, a sending resource, or the like for sending the uplink reference signal.

For example, for a periodic or semi-persistent uplink reference signal, one uplink reference signal instance may represent an uplink reference signal sent within one period.

For another example, assuming that the uplink reference signal is an SRS, the uplink reference signal instance may be expressed as an SRS time instance, an SRS time occasion, an SRS period, or the like. One SRS time instance may include at least one SRS resource or at least an SRS resource of one SRS resource set.

In addition, the foregoing "N" may be determined in this manner: prescribed in a protocol, indicated by a network, selected by the terminal, or the like. For example, an instance quantity N of the uplink reference signal instances may be sent together with a configuration of the uplink reference signal to the terminal, or included in a configuration of the uplink reference signal. This is not limited herein.

Based on this, in an implementation, assuming that the network indicates that the instance quantity of the uplink reference signal instances is N, during or after every N uplink reference signal instances, the terminal starts the first time window once.

Certainly, in addition to the description of the first time window in the foregoing method embodiment 200, in a possible implementation, a configuration of the first time window may be implemented in this manner: prescribed in a protocol, configured by the network, configured by a higher layer, or the like. For example, the terminal may obtain the configuration of the first time window. Optionally, in this embodiment, the configuration of the first time window may include at least one of the following (31) to (35).

(31) A start point of the time window.

Optionally, the start point of the time window includes any one of the following (311) to (318).

(311) A first position, where the first position is located at a first time unit after time units corresponding to the N uplink reference signal instances.

It is assumed that the N uplink reference signal instances correspond to M time units. The first position is located at the first time unit after the M time units, or at the first time unit after a last time unit among the M time units, or at the first time unit after a last instance (or a time unit corresponding to a last instance or a last time unit including a last instance) among the N uplink reference signal instances. Optionally, the first time unit may be an uplink time unit, a downlink time unit, or a flexible time unit.

For example, the first position is located at a first slot or symbol after a slot corresponding to the last instance among the N uplink reference signal instances (or after a last slot including the last instance); or the first position is located at a first slot or symbol after a symbol corresponding to the last instance among the N uplink reference signal instances (or after a last slot including the last instance).

It may be understood that all time units mentioned in the context of this application may be milliseconds (ms), slots, sub-slots, frames, subframes, symbols, or the like. This is not limited herein.

(312) A second position, where the second position is located at a first non-uplink time unit after the time units corresponding to the N uplink reference signal instances.

Similar to the first position, the second position may also be located at the first non-uplink time unit after the M time units, or at the first non-uplink time unit after the last time unit among the M time units, or at the first non-uplink time unit after the last instance (or the time unit corresponding to the last instance or the last time unit including the last instance) among the N uplink reference signal instances.

Optionally, the first non-uplink time unit may be a downlink time unit or a flexible time unit.

(313) A third position, where the third position is located at a first downlink time unit after the time units corresponding to the N uplink reference signal instances.

Similar to the first position, the third position may also be located at the first downlink time unit after the M time units, or at the first downlink time unit after the last time unit among the M time units, or at the first downlink time unit after the last instance (or the time unit corresponding to the last instance or the last time unit including the last instance) among the N uplink reference signal instances.

(314) A fourth position, where the fourth position is a first time unit corresponding to a specific CORESET.

The specific CORESET is used to monitor a first PDCCH corresponding to target feedback information. Based on this, the specific CORESET is a first CORESET after the N uplink reference signal instances and is associated with the first PDCCH, or the specific CORESET is a first CORESET at a first specified distance after the N uplink reference signal instances and is associated with the first PDCCH. Optionally, the first specified distance is determined in this manner: prescribed in a protocol, configured by a higher layer, or selected by the terminal.

(315) A fifth position, where the fifth position is located at a time unit after the time units corresponding to the N uplink reference signal instances and at a second specified distance from the time units corresponding to the N uplink reference signal instances (or the last instance among the N uplink reference signal instances).

The second specified distance may be implemented in this manner: prescribed in a protocol, configured by a higher layer, or selected by the terminal. For example, the second specified distance may be one time unit, that is, one symbol, one slot or subframe, or the like.

It should be noted that when the second specified distance includes a slot or symbol, a corresponding SCS is consistent with an SCS corresponding to the uplink reference signal, or is consistent with an SCS corresponding to an initial bandwidth part (BWP), or is consistent with an SCS corresponding to a specific search space, or is indicated by the network or prescribed in a protocol. This is not limited herein.

(316) A sixth position, where the sixth position is determined based on a first offset value and a start time or an end time of a first uplink reference signal instance or any specified time between the start time and the end time.

The first uplink reference signal instance belongs to the N uplink reference signal instances. In addition, the first offset value and/or the specified time may be obtained in this manner: prescribed in a protocol, configured by a higher layer, or configured by the network-side device.

(317) A seventh position, where the seventh position is a sending time of a specific PUSCH resource, and the specific PUSCH resource is associated with the N uplink reference signal instances.

That the specific PUSCH resource is associated with the N uplink reference signal instances may be understood as "the specific PUSCH resource is a corresponding resource or a resource carried when the terminal sends the uplink reference signal; or the specific PUSCH resource is a corresponding or carried payload when the terminal sends the uplink reference signal".

It may be understood that the payload may include an RRC resume request message.

(318) An eighth position, where the eighth position is a time indicated by the network, prescribed in a protocol, or configured by a higher layer.

(32) An end point of the time window.

The end point of the time window includes at least one of the following (321) or (322).

(321) A ninth position, where the ninth position is a receiving time of an RRC release message.

(322) A tenth position, where the tenth position is determined based on a second offset value and a start time or an end time of a second uplink reference signal instance or any specified time between the start time and the end time, where the second uplink reference signal instance belongs to the N uplink reference signal instances.

The second offset value and/or the specified time may be implemented in this manner: prescribed in a protocol, configured by a higher layer, or configured by the network-side device.

(33) A length of the time window.

The length of the time window may be in units of milliseconds (ms), slots, symbols, or the like. This is not limited herein.

In addition, in a case that the first time window includes at least one slot or symbol, an SCS corresponding to the slot or symbol is consistent with the SCS corresponding to the uplink reference signal; or a SCS corresponding to the slot or symbol is consistent with the SCS corresponding to the Initial BWP; or an SCS corresponding to the slot or symbol is consistent with the SCS corresponding to the specific search space, or an SCS corresponding to the slot or symbol may be determined in this manner: prescribed in a protocol, configured by a higher layer, or configured by the network-side device.

It should be noted that the specific search space may be a common search space or a UE specific search space, where the specific search space is used to search for the first PDCCH carrying the target feedback information, or used to search for the first PDCCH scheduling the target feedback information. Optionally, the specific search space is a dedicated search space corresponding to the target feedback information or a search space shared with other information.

The specific search space and the specific CORESET may be implemented in this manner: prescribed in a protocol, configured by a higher layer, or configured by the network-side device. This is not limited herein.

(34) A period of the time window.

(35) A period offset of the time window.

The period of the time window in (34) and/or the period offset of the time window in (35) may be implemented in this manner: indicated by the network, prescribed in a protocol, or configured by a higher layer.

Optionally, based on the foregoing description of the configuration of the first time window, before a step in which the terminal receives, based on the first time window, the target feedback information sent by the network-side device, and/or monitors the first PDCCH, the terminal may determine whether to start the first time window according to at least one of the following (41) to (43).

(41) The terminal indicates, to the network-side device, that the terminal starts or does not start the first time window, so that the network-side device can determine, based on the indication of the terminal, whether to feed back the target feedback information to the terminal. For example, in a case that the terminal indicates that the terminal starts the first time window, the network-side device sends the target feedback information. For another example, in a case that the terminal indicates that the terminal does not start the first time window, the network-side device does not send the target feedback information.

In an implementation, the step in which the terminal indicates, to the network-side device, that the terminal starts or does not start the first time window may include at least one of the following (411) to (414).

(411) The terminal indicates, to the network-side device by using sequence information of the uplink reference signal, that the terminal starts or does not start the first time window.

Different uplink reference signal sequences may be distinguished by cyclic shifts or sequence IDs.

Based on this, assuming that sequence information A corresponds to starting the first time window and that sequence information B corresponds to not starting the first time window, if the sequence information of the uplink reference signal is A, the network-side device may determine that the terminal starts the first time window. If the sequence information of the uplink reference signal is B, the network-side device may determine that the terminal does not start the first time window.

(412) The terminal indicates, to the network-side device by using a mapping mode of the uplink reference signal, that the terminal starts or does not start the first time window.

Different mapping modes of uplink reference signals may be distinguished by different time-frequency domain positions when time-frequency resources of the uplink reference signals are mapped, or by different comb offsets, or by different time-frequency domain resource positions.

Based on this, assuming that mapping mode A corresponds to starting the first time window and that mapping mode B corresponds to not starting the first time window, if the mapping mode of the uplink reference signal is A, the network-side device may determine that the terminal starts the first time window. If the mapping mode of the uplink reference signal is B, the network-side device may determine that the terminal does not start the first time window.

(413) The terminal indicates, to the network-side device by using a specific PUSCH resource corresponding to the uplink reference signal, that the terminal starts or does not start the first time window.

In other words, the terminal may indicate, by using the payload carried in or corresponding to the uplink reference signal, that the terminal starts or does not start the first time window.

(414) The terminal indicates, to the network-side device by using a SDT mode, that the terminal starts or does not start the first time window.

(42) The terminal receives first indication information sent by the network-side device, where the first indication information is used to instruct the terminal to start or not to start the first time window.

In this embodiment, the first indication information is transmitted by using a paging message, a paging early indication (PEI), or system information, or is indicated by using specific downlink signaling.

In a case that the first indication information is transmitted by using a paging message, the first indication information may be included or carried in a paging PDCCH or paging PDSCH. The first indication information is represented by a bit of a short message in the paging PDCCH or represented by a reserved bit in the paging PDCCH.

In a case that the first indication information is transmitted by using system information, the system information may be but is not limited to SIB1, SIBx, or a positioning system information block (posSIB).

The indication by using specific downlink signaling is an indication by using a specific PDCCH before the first time window. Optionally, a distance between the PDCCH and the start point of the first time window is not less than a preset threshold.

(43) The terminal determines, based on a target discontinuous reception (DRX) configuration, to start or not to start the first time window, where the target DRX configuration is a DRX configuration in the inactive state or the idle state.

Optionally, the step in which the terminal determines, based on the target DRX configuration, to start or not to start the first time window may include at least one of the following (431) to (433).

(431) If the first time window is within on duration (on duration or active time or PO) of the target DRX configuration, the terminal starts the first time window. Alternatively, if the first time window overlaps on duration of the target DRX configuration, the terminal starts only an overlapping part of the first time window.

(432) In a case that a time difference between the first time window and a target PO does not exceed a first threshold, the terminal starts the first time window, where the target PO is a PO nearest to the first time window among a plurality of POs. Optionally, a distance from the PO is a distance from a last time unit or a first time unit of the PO.

(433) In a case that a difference between the first time window and a transmission time when the terminal last transmits (such as sends, or receives) a physical signal and/or a physical channel does not exceed a second threshold, the terminal starts the first time window.

The physical signal and/or the physical channel include/includes but are/is not limited to at least one of an SSB, a CSI-RS, a PRS, paging, SIB1, SIBx, a PRACH, Msg1/2/3/4, MsgA/B, a PDCCH, or a PDSCH.

It may be understood that the first threshold and the second threshold described in (432) and (433), and a third threshold, a fourth threshold, a fifth threshold, and the like mentioned later may all be implemented in this manner: prescribed in a protocol or configured by a higher layer. This is not limited herein.

S330. The terminal receives, based on the first time window, the target feedback information sent by the network-side device, and/or monitors the first channel PDCCH.

The target feedback information is carried in the first PDCCH, and/or the target feedback information is carried in the PDSCH scheduled by the first PDCCH.

It may be understood that for an implementation process of S330, reference may be made to the related description in the method embodiment 200. In a possible implementation, the target feedback information may be a media access control (MAC) message or an RRC message.

Optionally, the target feedback information may include at least one of the following (51) to (57).

(51) First information, used to indicate presence or absence of a configuration update of the uplink reference signal.

(52) Second information, used to indicate presence or absence of a TA update.

(53) Third information, used to indicate whether the network-side device successfully receives or measures the uplink reference signal.

(54) Fourth information, used to instruct the terminal to enter or not to enter a connected state.

(55) Fifth information, used to indicate a TA update value or a TA variation.

(56) A TA validity parameter or update information of a TA validity parameter.

The TA validity parameter may include a time alignment timer or a TA validity time timer, an RSRP change threshold, a reference signal identifier and/or configuration corresponding to measured RSRP, or the like. In addition, “presence or absence” and “entering or not entering” mentioned in the foregoing (51) and (52) and the context of this application may also be expressed as “whether there is”, “whether to enter”, or the like.

(57) A configuration of the uplink reference signal or a configuration update of the uplink reference signal.

The configuration or configuration update of the uplink reference signal may include a spatial relation parameter, a power control parameter, an SRS time domain configuration, an SRS frequency domain configuration, a configuration of the first time window, or the like.

Certainly, in an implementation, when the terminal monitors the first PDCCH based on the first time window, if there is an overlap between the first time window and a PO, the terminal performs either of the following (61) and (62) within the overlapping time.

(61) Monitoring only a paging PDCCH.

Optionally, if the terminal monitors only the paging PDCCH within the overlapping time, the paging PDCCH and/or the first PDSCH include/includes the target feedback information. In addition, it may be understood that while the terminal monitors only the paging PDCCH within the overlapping time, the terminal may also monitor the first PDCCH within a non-overlapping time. This is not limited herein.

(62) Monitoring the paging PDCCH and the first PDCCH.

Optionally, if the terminal monitors the paging PDCCH and the first PDCCH within the overlapping time, if the paging PDCCH and/or the paging PDSCH include/includes the target feedback information, the terminal stops monitoring the PDCCH corresponding to the feedback information within the overlapping time.

Optionally, the terminal may not monitor the first PDCCH within the time when the first time window does not overlap the PO.

Alternatively, in another implementation, in a case that the terminal does not receive, within the first time window, the target feedback information sent by the network-side device, the terminal may perform at least one of the following (71) to (74):

(71) resending the uplink reference signal to the network-side device, to reinitiate a positioning procedure to implement terminal positioning;

(72) initiating an SDT process, where the SDT process is used to request to update a configuration of the uplink reference signal and/or a TA validity parameter, to ensure validity of the configuration of the uplink reference signal and/or the TA validity parameter;

(73) entering a connected state by initiating a random access procedure and reestablishing a connection to the network-side device; or

(74) ignoring a reception result, where the reception result is that the terminal does not receive, within the first time window, the target feedback information sent by the network-side device. For example, after ignoring the reception result, the terminal assumes that the current configuration of the uplink reference signal and/or the TA validity condition are/is available, thereby determining reliability of execution of the positioning process. The terminal continues to send the uplink reference signal based on the previous configuration and TA.

Figure 4:
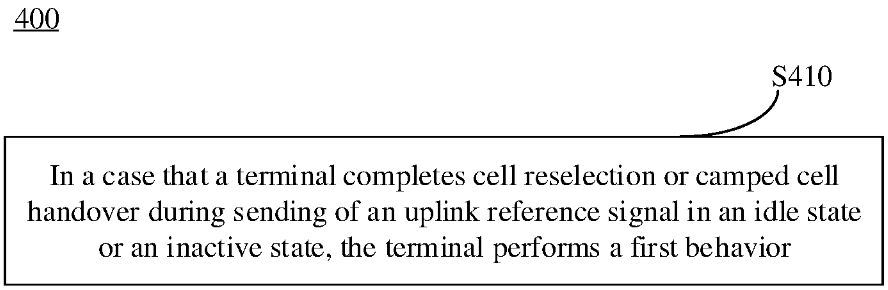
FIG. 4 is a schematic flowchart of a positioning method according to still another exemplary embodiment of this application.

FIG. 4 is a schematic flowchart of a positioning method 400 according to an exemplary embodiment of this application. The method 400 may be performed by a terminal, but this is not limited. The method 400 may be performed by hardware and/or software installed in the terminal. In this embodiment, the method 400 may include at least the following step.

S410. In a case that a terminal completes cell reselection or camped cell handover during sending of an uplink reference signal in an idle state or an inactive state, the terminal performs a first behavior.

The uplink reference signal includes an uplink positioning reference signal and/or an uplink sensing signal. For related descriptions of the uplink reference signal, refer to the descriptions in the method embodiments 200 and/or 300. To avoid repetition, no limitation is imposed herein.

In addition, considering that the uplink reference signal may be sent periodically and in some scenarios (such as indoor scenarios), cells are densely deployed and the terminal has mobility, which may lead to frequent cell reselection or camped cell handover, in an implementation, if the terminal completes cell reselection or camped cell handover during sending of one or more continuous uplink reference signals, the terminal may perform the first behavior to perform processing related to sending, releasing, updating, or the like of the uplink reference signal, to ensure validity and reliability of a TA configuration and/or an uplink reference signal (such as an SRS) configuration in a positioning process.

Certainly, the first behavior is related to the sending, releasing, or updating of the uplink reference signal. In a possible implementation, the first behavior may include at least one of the following (81) to (86).

(81) Initiating an SDT process, where the SDT process is used to request to update a configuration of the uplink reference signal and/or a TA validity parameter.

(82) Releasing a reference signal resource corresponding to the uplink reference signal.

(83) Entering a connected state by initiating a random access procedure to complete uplink positioning, and/or updating at least one of the configuration of the uplink reference signal and/or the TA validity parameter, and/or determining a terminal behavior based on a network indication.

(84) Sending a first message (Msg1 or preamble, or PRACH) based on a 4-step random access process, where the first message is used to request a network-side device to update the TA validity parameter, or Msg1 is used by the terminal to request the network-side device to update a TA in a second message (Msg2).

Optionally, the PRACH corresponding to Msg1 may be a dedicated PRACH, so that the terminal can update the TA in the inactive state without entering the connected state. In addition, the dedicated PRACH corresponds to a dedicated preamble and/or a dedicated PRACH time-frequency position.

It should be noted that the random access process associated with sending of Msg1 by the terminal is a non-contention random access process.

Optionally, after the step in which the terminal sends Msg1 based on the 4-step random access process, if the terminal receives Msg2 sent by the network-side device, the terminal can perform a TA update according to TA update information or a TA command carried in the second message.

The TA update information may include at least one of the following (841) or (842):

(841) a TA variation or an updated TA value; or (842) a TA validity parameter or a TA validity parameter update.

It may be understood that the terminal does not expect that Msg2 includes scheduling information for scheduling a third message (Msg3), or that the terminal does not expect that Msg2 includes other information than the TA update information.

Certainly, if the terminal is in the idle state or inactive state when the terminal receives the second message (Msg2), the terminal may perform at least one of the following (843) to (846):

(843) ignoring the scheduling information carried in the second message, where the scheduling information is used to schedule the third message;

(844) ignoring other information in the second message than the TA update information, and remaining in the idle state or inactive state;

(845) ignoring a procedure for sending the third message; or (846) ignoring a procedure for receiving a fourth message, where the fourth message corresponds to the third message, and is a message fed back by the network-side device to the terminal based on the third message.

(85) Sending the uplink reference signal based on a TA of a last cell.

That the terminal sends the uplink reference signal based on a TA of a last cell may be understood as "the terminal maintains the TA of the last cell or a compensated TA for sending the uplink reference signal".

In an implementation, the terminal may compensate for a preset N-TA-offset before sending the uplink reference signal based on the TA of the last cell. The N-TA-offset may be obtained based on a target cell or the last cell.

(86) Performing TA compensation based on an RSTD between the target cell and the last cell, and sending the uplink reference signal based on the compensated TA.

Optionally, the RSTD may indicate an arrival time difference caused by a difference between distances from the terminal to two gNBs, or a time difference in downlink (DL) reference signal timing measurement.

In an implementation, the compensated TA may be twice the RSTD. In addition, before the uplink reference signal is sent based on the compensated TA, it is necessary to compensate for the preset N-TA-offset. The N-TA-offset may be obtained based on the target cell or the last cell.

It may be understood that the last cell mentioned in the context of this application is a cell before the terminal performs cell reselection or camped cell handover or a cell whose TA is valid; and the target cell (or new cell) is a cell after the terminal performs cell reselection or camped cell handover.

For the first behavior described in the foregoing (81) to (86), in a possible implementation, in a case that any condition in a first condition group is met, the first behavior may include at least one of initiating the SDT process, releasing the reference signal resource corresponding to the uplink reference signal, or entering the connected state by initiating the random access procedure. Optionally, the first behavior is: releasing an uplink resource corresponding to the uplink reference signal and initiating the SDT process, or releasing an uplink resource corresponding to the uplink reference signal and initiating random access to enter the connected state. In other words, if any one of the conditions in the first condition group is met, a TA validity parameter of the last cell is no longer valid.

Conversely, the terminal may perform the behavior of (85), that is, send the uplink reference signal based on the TA of the last cell, only when no condition in the first condition group is met, for example, when the TA validity parameter of the last cell is not invalid, and the RSTD between the target cell and the last cell does not exceed a threshold, and/or an RSRP difference between the target cell and the last cell does not exceed a threshold, and a time of camping on the target cell exceeds a threshold.

Based on this, in an implementation, the condition in the first condition group includes at least one of the following (91) to (96).

(91) A TA validity condition of the last cell is invalid.

Assuming that the TA validity parameter includes an RSRP threshold and a TA timer, that the TA validity condition is invalid may be that an RSRP change exceeds the RSRP threshold or that the TA timer expires. It may be understood that the RSRP change is an RSRP change of a synchronization signal and PBCH block (SSB) since the terminal receives the TA command.

(92) The RSTD between the target cell and the last cell exceeds a third threshold.

The RSTD is a reference signal time difference obtained by the terminal by measuring reference signals of the last cell and the target cell. In other words, the RSTD may be expressed as an arrival time difference caused by a difference between distances from the terminal and to two gNBs, or as a time difference in DL reference signal timing measurement.

In an implementation, a reference cell for the RSTD may be the last cell or the target cell.

In addition, when sending cell list information to the terminal, the network-side device may simultaneously indicate an SFN0-offset (SFN0 offset value) or an SFN0 absolute time or time difference between first cells in the cell list information to assist the terminal in calculating the RSTD, where the RSTD includes only a time difference in spatial signal transmission and does not include a time difference caused by an offset of a sending time of the cell.

(93) The RSRP difference between the target cell and the last cell exceeds a fourth threshold.

The RSRP difference is a reference signal received power difference obtained by the terminal by measuring reference signals of the new cell and the last cell.

The RSTD in (92) and the RSRP in (93) may be obtained by the terminal by measuring information such as an SSB, a DL PRS (Downlink Positioning RS), and a CSI-RS. In an implementation, the RSTD or RSRP may be obtained through calculation based on a group of reference signals, and the group of reference signals may be at least one of the following (931) to (933):

(931) S reference signal resources with highest RSRP, such as S SSBs with highest RSRP;

(932) a group of reference signals preconfigured or prescribed in a protocol, such as a group of SSBs used to obtain SIB1; or (933) a group of reference signals indicated by the network, such as a reference signal dedicated to calculating an RSTD or an RSRP difference.

Optionally, for measurement of the RSTD and RSRP, the network may also indicate an expected RSTD and expected-RSTD-Uncertain to assist the terminal in measuring an RS in each first cell in the cell information list.

Condition-related parameters such as the RSTD threshold and/or RSRP difference threshold and the reference signal configuration may be obtained in at least one manner: prescribed in a protocol, indicated by the network, or selected by the terminal. When indicated by the network, the condition-related parameters such as the RSTD threshold and/or RSRP difference threshold and the reference signal configuration may be sent together with the configuration of the uplink reference signal, or included in the configuration of the uplink reference signal. Optionally, the foregoing measurement quantities or calculation quantities such as the RSTD and RSRP difference are only examples of measurement quantities or calculation quantities based on reference signals between the target cell and the last cell. In the application, the foregoing measurement quantities and calculation quantities may include but are not limited to at least one of the RSTD, the RSRP difference, or an RSRQ difference.

(94) The time of camping on the target cell by the terminal exceeds a fifth threshold.

(95) A downlink timing difference between the target cell and the last cell exceeds a sixth threshold.

(96) The target cell does not allow a terminal camping on the target cell to send an uplink reference signal without receiving sixth information, where the sixth information is a TA command and/or a TA validity parameter of the target cell.

In other words, the target cell does not allow that the terminal can send an uplink signal/data (except the PRACH/preamble) to the network-side device without receiving the TA command of the target cell after the terminal is handed over from the last cell to the target cell. Alternatively, the target cell does not allow that the terminal can send an uplink signal/data (except the PRACH/preamble) based on the TA validity parameter of the last cell after the terminal is handed over from the camped cell to the target cell.

In another possible implementation, in a case that no condition in the first condition group is met, the first behavior includes: sending the uplink reference signal based on the TA of the last cell; and/or performing the TA compensation based on the RSTD between the target cell and the last cell, and sending the uplink reference signal based on the compensated TA. In other words, in a case that no condition in the first condition group is met, the terminal keeps the TA of the last cell to send the uplink reference signal, or after the terminal compensates for the TA based on the RSTD between the new cell and the last cell, the terminal sends the uplink reference signal based on the compensated TA.

Optionally, similarly to the positioning process provided in the method embodiment 200, in this embodiment, to prevent the terminal from frequently initiating SDT or entering the connected state and further leading to a problem of high energy consumption of the terminal because the terminal frequently initiates cell reselection or camped cell handover when cells are densely deployed and/or the terminal has mobility, this application can extend an effective area of the uplink reference signal to a plurality of cells, thereby reducing behaviors of frequently initiating SDT or entering the connected state by the terminal.

For example, before performing step S410, the terminal may receive the cell list information sent by the network-side device. The cell list information may include information about at least one first cell to assist in sending the uplink reference signal when the terminal moves in the at least one first cell, or to indicate that the configuration of the uplink reference signal is valid in each first cell included in the cell list, thereby extending the effective area of the uplink reference signal.

It may be understood that for the detailed description of the implementation process of the cell list information or the like, reference may be made to the description in the method embodiment 200. To avoid repetition, details are not described herein again.

In this embodiment, the terminal sends the uplink reference signal in the idle state or the inactive state. Therefore, a problem of high energy consumption of the terminal due to terminal positioning can be effectively alleviated. In addition, the terminal performs the first behavior related to the sending, releasing, or updating of the uplink reference signal, thereby ensuring validity of the TA or validity of the configuration of the uplink reference signal after the terminal completes the cell reselection or camped cell handover.

It should be noted that the positioning methods 200 to 400 provided in the embodiments of this application may be performed by a positioning apparatus, or a control module configured to perform the positioning method in the positioning apparatus. The positioning apparatus provided in the embodiments of this application is described by assuming that the positioning apparatus performs the positioning methods 200 to 400 in the embodiments of this application.

Figure 5:
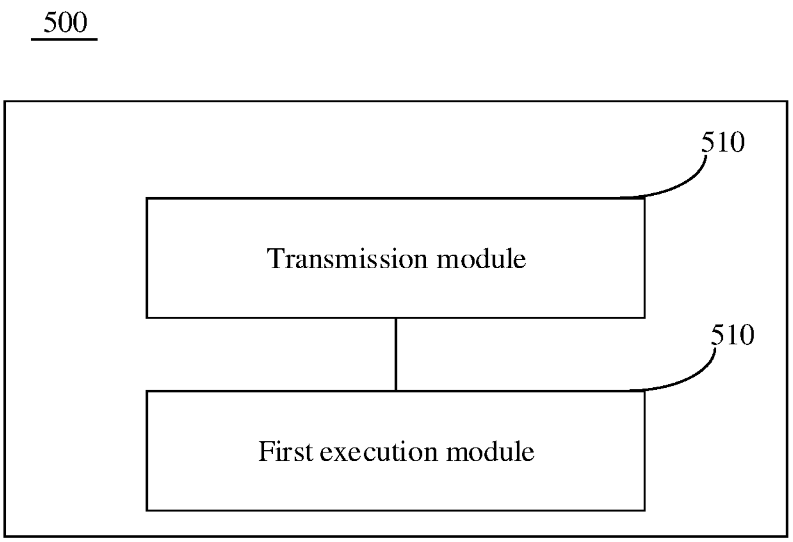
FIG. 5 is a schematic structural diagram of a positioning apparatus according to an exemplary embodiment of this application.

FIG. 5 is a schematic structural diagram of a positioning apparatus 500 according to an exemplary embodiment of this application. The positioning apparatus 500 includes: a transmission module 510, configured to send an uplink reference signal in an idle state or an inactive state, where the uplink reference signal includes an uplink positioning reference signal and/or an uplink sensing signal; and a first execution module 520, configured to receive, based on a first time window, target feedback information sent by a network-side device, and/or monitor, based on a first time window, a first PDCCH, where the target feedback information is carried in the first PDCCH, and/or the target feedback information is carried in a PDSCH scheduled by the first PDCCH. In an implementation, the second execution module 520 is further configured to start the first time window during N uplink reference signal instances or after N uplink reference signal instances, where the uplink reference signal instance is used to transmit the uplink reference signal, and N is an integer greater than or equal to 1.

In an implementation, the first execution module 520 obtains a configuration of the first time window, where the configuration of the first time window includes at least one of the following: a start point of the time window, an end point of the time window, a length of the time window, a period of the time window, or a period offset of the time window.

In an implementation, the start point of the time window includes any one of the following: a first position, where the first position is located at a first time unit after time units corresponding to the N uplink reference signal instances; a second position, where the second position is located at a first non-uplink time unit after the time units corresponding to the N uplink reference signal instances; a third position, where the third position is located at a first downlink time unit after the time units corresponding to the N uplink reference signal instances; a fourth position, where the fourth position is a first time unit corresponding to a specific CORESET, where the specific CORESET is a first CORESET after the N uplink reference signal instances and is associated with the first PDCCH, or the specific CORESET is a first CORESET at a first specified distance after the N uplink reference signal instances and is associated with the first PDCCH; a fifth position, where the fifth position is located at a time unit after the time units corresponding to the N uplink reference signal instances and at a second specified distance from the time units corresponding to the N uplink reference signal instances; a sixth position, where the sixth position is determined based on a first offset value and a start time or an end time of a first uplink reference signal instance or any specified time between the start time and the end time, where the first uplink reference signal instance belongs to the N uplink reference signal instances; a seventh position, where the seventh position is a sending time of a specific PUSCH resource, and the specific PUSCH resource is associated with the N uplink reference signal instances; or an eighth position, where the eighth position is a time indicated by a network, prescribed in a protocol, or configured by a higher layer.

In an implementation, the end point of the time window includes at least one of the following: a ninth position, where the ninth position is a receiving time of a RRC release message; or a tenth position, where the tenth position is determined based on a second offset value and a start time or an end time of a second uplink reference signal instance or any specified time between the start time and the end time, where the second uplink reference signal instance belongs to the N uplink reference signal instances.

In an implementation, a SCS corresponding to a slot or a symbol in the first time window meets any one of the following: the SCS corresponding to the slot or the symbol is consistent with an SCS corresponding to the uplink reference signal; or the SCS corresponding to the slot or the symbol is consistent with an SCS corresponding to an initial BWP; or the SCS corresponding to the slot or the symbol is consistent with an SCS corresponding to a specific search space, where the specific search space is used to search for the first PDCCH.

In an implementation, the target feedback information includes at least one of the following: first information, used to indicate presence or absence of a configuration update of the uplink reference signal; second information, used to indicate presence or absence of a TA update; third information, used to indicate whether the network-side device successfully receives or measures the uplink reference signal; fourth information, used to instruct the terminal to enter or not to enter a connected state; fifth information, used to indicate a TA update value or a TA variation; a TA validity parameter or update information of a TA validity parameter; or a configuration of the uplink reference signal or a configuration update of the uplink reference signal.

In an implementation, the first execution module 520 is further configured to perform at least one of the following: indicating, to the network-side device, that the terminal starts or does not start the first time window; receiving first indication information sent by the network-side device, where the first indication information is used to instruct the terminal to start or not to start the first time window; or determining, based on a target DRX configuration, to start or not to start the first time window, where the target DRX configuration is a DRX configuration in the inactive state or the idle state.

In an implementation, the step of indicating, by the first execution module 520 to the network-side device, that the terminal starts or does not start the first time window includes at least one of the following: indicating, to the network-side device by using sequence information of the uplink reference signal, that the terminal starts or does not start the first time window; indicating, to the network-side device by using a mapping mode of the uplink reference signal, that the terminal starts or does not start the first time window; indicating, to the network-side device by using a specific PUSCH resource corresponding to the uplink reference signal, that the terminal starts or does not start the first time window; or indicating, to the network-side device by using a SDT mode, that the terminal starts or does not start the first time window.

In an implementation, the first indication information is transmitted by using a paging message or system information.

In an implementation, the step of determining, by the first execution module 520 based on a target DRX configuration, to start or not to start the first time window includes at least one of the following: if the first time window is within on duration of the target DRX configuration, starting, by the terminal, the first time window; in a case that a time difference between the first time window and a target PO does not exceed a first threshold, starting, by the terminal, the first time window, where the target PO is a PO nearest to the first time window among a plurality of POs; or in a case that a difference between the first time window and a transmission time when the terminal last transmits a physical signal and/or a physical channel does not exceed a second threshold, starting, by the terminal, the first time window.

In an implementation, the first execution module 520 is further configured to perform at least one of the following in a case that the target feedback information sent by the network-side device is not received within the first time window: resending the uplink reference signal to the network-side device; initiating an SDT process, where the SDT process is used to request to update a configuration of the uplink reference signal and/or a TA validity parameter; entering a connected state by initiating a random access procedure; or ignoring a reception result, where the reception result is that the terminal does not receive, within the first time window, the target feedback information sent by the network-side device.

In an implementation, the first execution module 520 is further configured to perform either of the following within an overlapping time in a case that there is an overlap between the first time window and a PO: monitoring only a paging PDCCH; and monitoring the paging PDCCH and the first PDCCH.

In an implementation, a target configuration is a dedicated configuration dedicated to receiving the target feedback information, or a target configuration is a shared configuration for receiving the target feedback information and/or other information than the target feedback information, where the target configuration includes at least one of the following: the configuration of the first time window; a configuration of a search space associated with the first PDCCH; a configuration of the CORESET associated with the first PDCCH; or a configuration of an RNTI associated with the first PDCCH.

In an implementation, the transmission module 510 is further configured to receive cell list information sent by the network-side device, where the cell list information includes information about at least one first cell to assist in sending the uplink reference signal when the terminal moves in the at least one first cell.

In an implementation, the cell list information includes at least one of the following: identification information of each first cell; related time information of each first cell; configuration information of a target reference signal of each first cell, where the target reference signal is used to assist the terminal in calculating an RSTD or a RSRP difference; a threshold for an RSTD between the first cells; a threshold for an RSRP difference between the first cells; a TA-related parameter of each first cell; or information about a second cell, where the second cell is a cell that is in the at least one first cell and capable of allowing a terminal camping on the second cell to send an uplink reference signal without receiving sixth information, and the sixth information is a TA command and/or a TA validity parameter of the second cell.

Figure 6:
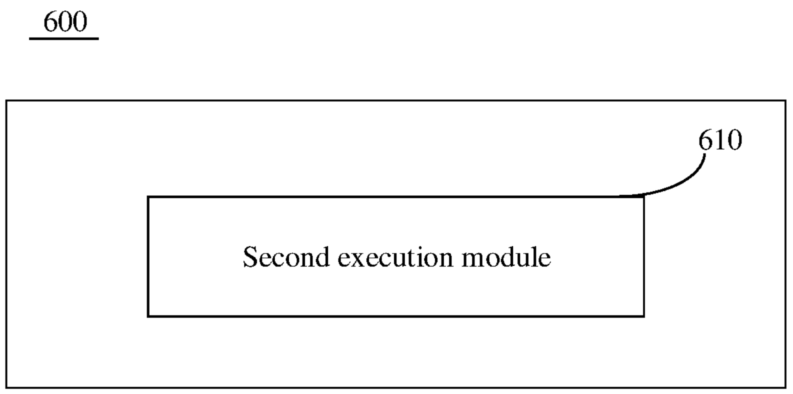
FIG. 6 is a schematic structural diagram of a positioning apparatus according to another exemplary embodiment of this application.

FIG. 6 is a schematic structural diagram of a positioning apparatus 600 according to an exemplary embodiment of this application. The apparatus 600 includes a second execution module 610, configured to perform a first behavior in a case that the terminal completes cell reselection or camped cell handover during sending of an uplink reference signal in an idle state or an inactive state, where the first behavior is related to the sending, releasing, or updating of the uplink reference signal, and the uplink reference signal includes an uplink positioning reference signal and/or an uplink sensing signal.

In an implementation, the first behavior includes at least one of the following: initiating an SDT process, where the SDT process is used to request to update a configuration of the uplink reference signal and/or a TA validity parameter; releasing a reference signal resource corresponding to the uplink reference signal; entering a connected state by initiating a random access procedure; sending a first message based on a 4-step random access process, where the first message is used to request a network-side device to perform a TA update; sending the uplink reference signal based on a TA of a last cell; or performing TA compensation based on an RSTD between a target cell and the last cell, and sending the uplink reference signal based on a compensated TA.

In an implementation, in a case that any condition in a first condition group is met, the first behavior includes at least one of the initiating an SDT process, the releasing a reference signal resource corresponding to the uplink reference signal, or the entering a connected state by initiating a random access procedure, where the condition in the first condition group includes at least one of the following: a TA validity condition of the last cell is invalid; the RSTD between the target cell and the last cell exceeds a third threshold; an RSRP difference between the target cell and the last cell exceeds a fourth threshold; a time of camping on the target cell by the terminal exceeds a fifth threshold; a downlink timing difference between the target cell and the last cell exceeds a sixth threshold; or the target cell does not allow a terminal camping on the target cell to send an uplink reference signal without receiving sixth information, where the sixth information is a TA command and/or a TA validity parameter of the target cell.

In an implementation, in a case that no condition in the first condition group is met, the first behavior includes either of the following: sending the uplink reference signal based on the TA of the last cell; and performing the TA compensation based on the RSTD between the target cell and the last cell, and sending the uplink reference signal based on the compensated TA.

In an implementation, in a case that a second message sent by the network-side device is received, the second execution module 610 is further configured to perform a TA update based on TA update information carried in the second message.

In an implementation, the TA update information includes at least one of the following: a TA variation; or a TA validity parameter.

In an implementation, in a case that a second message is received and that the terminal is in the idle state or inactive state, the second execution module 610 is further configured to perform at least one of the following: ignoring scheduling information carried in the second message, where the scheduling information is used to schedule a third message; ignoring other information in the second message than TA update information, and remaining in the idle state or inactive state; ignoring a procedure for sending the third message; or ignoring a procedure for receiving a fourth message, where the fourth message corresponds to the third message.

In an implementation, the second execution module 610 is further configured to receive cell list information sent by the network-side device, where the cell list information includes information about at least one first cell to assist in sending the uplink reference signal when the terminal moves in the at least one first cell.

In an implementation, the cell list information includes at least one of the following: identification information of each first cell; related time information of each first cell; configuration information of a target reference signal of each first cell, where the target reference signal is used to assist the terminal in calculating an RSTD or a RSRP difference; a threshold for an RSTD between the first cells; a threshold for an RSRP difference between the first cells; a TA-related parameter of each first cell; or information about a second cell, where the second cell is a cell that is in the at least one first cell and capable of allowing a terminal camping on the second cell to send an uplink reference signal without receiving sixth information, and the sixth information is a TA command and/or a TA validity parameter of the second cell.

The positioning apparatus 500 and/or 600 in this embodiment of this application may be an apparatus, or an apparatus or an electronic device with an operating system, or may be a component, an integrated circuit, or a chip in a terminal. The apparatus or the electronic device may be a mobile terminal, or may be a nonmobile terminal. For example, the mobile terminal may include but is not limited to the foregoing illustrated type of the terminal 11. The nonmobile terminal may be a server, a network attached storage (NAS), a personal computer (PC), a television (TV), a teller machine, a self-service machine, or the like. This is not specifically limited in this embodiment of this application.

The positioning apparatus 500 and/or 600 provided in this embodiment of this application can implement each process implemented by the method embodiments in FIG. 2 to FIG. 4, with the same technical effect achieved. To avoid repetition, details are not described herein again.

Figure 7:
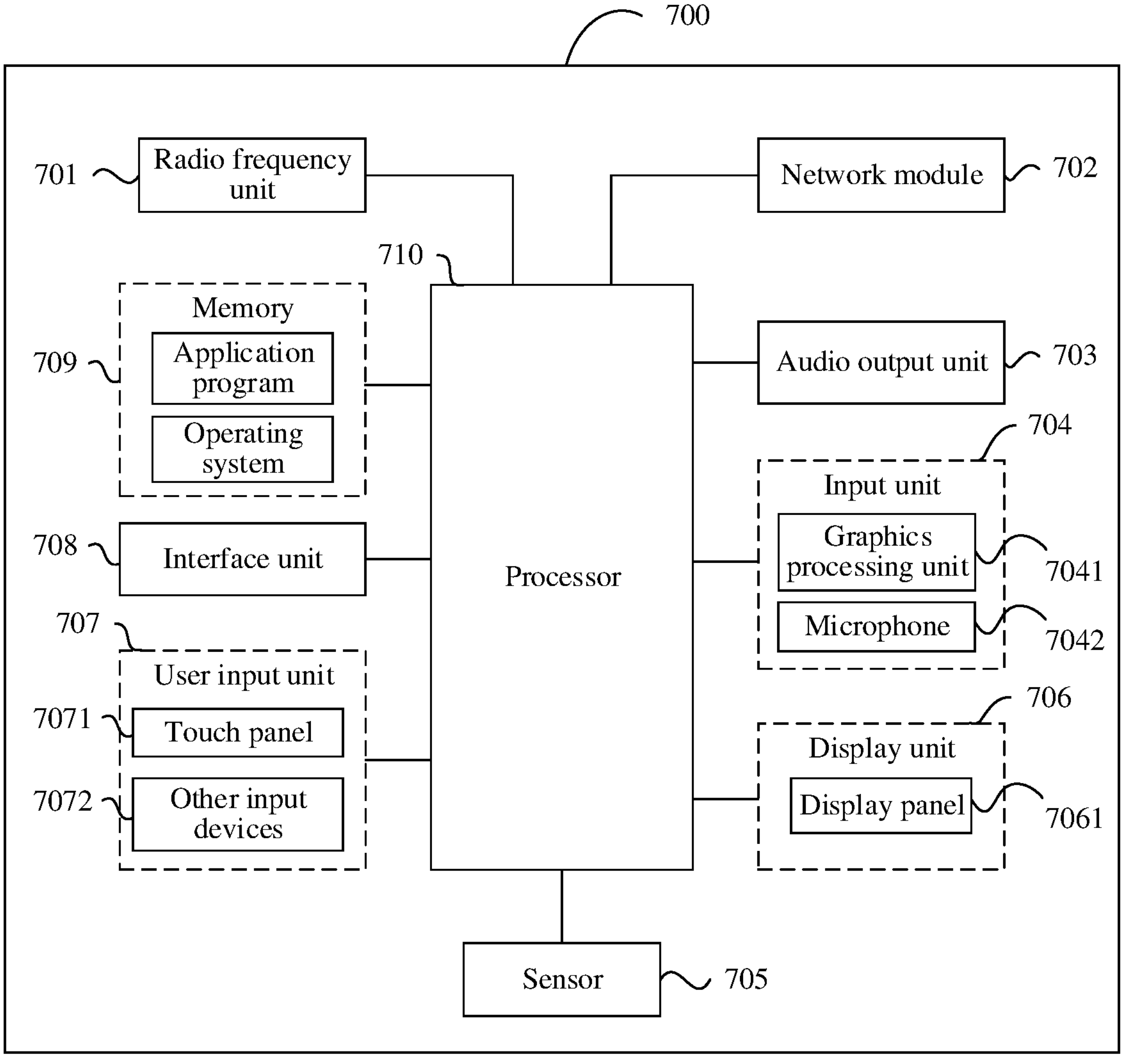
FIG. 7 is a schematic structural diagram of a terminal according to an exemplary embodiment of this application.

An embodiment of this application further provides a terminal, including a processor and a communication interface. The communication interface is coupled to the processor. The processor is configured to execute a program or instructions to implement the steps of the methods in the method embodiments 200 to 400. The terminal embodiment corresponds to the foregoing terminal-side method embodiment, and each implementation process and implementation of the foregoing method embodiment can be applied to the terminal embodiment, with the same technical effect achieved. Optionally, FIG. 7 is a schematic diagram of a hardware structure of a terminal for implementing an embodiment of this application.

The terminal 700 includes but is not limited to at least some components such as a radio frequency unit 701, a network module 702, an audio output unit 703, an input unit 704, a sensor 705, a display unit 706, a user input unit 707, an interface unit 708, a memory 709, and a processor 710.

A person skilled in the art may understand that the terminal 700 may further include a power supply (for example, a battery) supplying power to all components. The power supply may be logically connected to the processor 710 through a power management system. In this way, functions such as charge management, discharge management, and power consumption management are implemented by using the power management system. The terminal structure shown in FIG. 7 does not constitute a limitation on the terminal. The terminal may include more or fewer components than those shown in the figure, or some components are combined, or component arrangements are different. Details are not described herein again.

It should be understood that, in this embodiment of this application, the input unit 704 may include a graphics processing unit (GPU) 7041 and a microphone 7042. The graphics processing unit 7041 processes image data of a still picture or video obtained by an image capture apparatus (such as a camera) in a video capture mode or an image capture mode. The display unit 706 may include a display panel 7061, and the display panel 7061 may be configured in a form of a liquid crystal display, an organic light-emitting diode, or the like. The user input unit 707 includes a touch panel 7071 and other input devices 7072. The touch panel 7071 is also referred to as a touchscreen. The touch panel 7071 may include two parts: a touch detection apparatus and a touch controller. The other input devices 7072 may include but are not limited to a physical keyboard, a function button (such as a volume control button or a power button), a trackball, a mouse, and a joystick. Details are not described herein again.

In this embodiment of this application, after receiving downlink data from a network-side device, the radio frequency unit 701 sends the downlink data to the processor 710 for processing, and in addition, sends uplink data to the network-side device. Generally, the radio frequency unit 701 includes but is not limited to an antenna, at least one amplifier, a transceiver, a coupler, a low noise amplifier, a duplexer, and the like.

The memory 709 may be configured to store software programs or instructions and various data. The memory 709 may primarily include a program or instruction storage area and a data storage area. The program or instruction storage area may store an operating system, an application or instructions (such as an audio play function and an image play function) required by at least one function, and the like. In addition, the memory 709 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another non-volatile solid-state storage device.

The processor 710 may include one or more processing units. Optionally, the processor 710 may integrate an application processor and a modem processor. The application processor mainly processes the operating system, a user interface, an application or an instruction, and the like. The modem processor mainly processes wireless communication. For example, the modem processor is a baseband processor. It may be understood that the modem processor may alternatively not be integrated in the processor 710.

The radio frequency unit 701 is configured to send an uplink reference signal in an idle state or an inactive state, where the uplink reference signal includes an uplink positioning reference signal and/or an uplink sensing signal.

The processor 710 is configured to receive, based on a first time window, target feedback information sent by a network-side device, and/or monitor, based on a first time window, a first physical downlink control channel PDCCH, where the target feedback information is carried in the first PDCCH, and/or the target feedback information is carried in a physical downlink shared channel PDSCH scheduled by the first PDCCH.

In an implementation, the processor 710 is further configured to start the first time window during N uplink reference signal instances or after N uplink reference signal instances, where the uplink reference signal instance is used to transmit the uplink reference signal, and N is an integer greater than or equal to 1.

In an implementation, the processor 710 is further configured to obtain a configuration of the first time window, where the configuration of the first time window includes at least one of the following: a start point of the time window, an end point of the time window, a length of the time window, a period of the time window, or a period offset of the time window.

In an implementation, the start point of the time window includes any one of the following: a first position, where the first position is located at a first time unit after time units corresponding to the N uplink reference signal instances; a second position, where the second position is located at a first non-uplink time unit after the time units corresponding to the N uplink reference signal instances; a third position, where the third position is located at a first downlink time unit after the time units corresponding to the N uplink reference signal instances; a fourth position, where the fourth position is a first time unit corresponding to a specific CORESET, where the specific CORESET is a first CORE- SET after the N uplink reference signal instances and is associated with the first PDCCH, or the specific CORESET is a first CORESET at a first specified distance after the N uplink reference signal instances and is associated with the first PDCCH; a fifth position, where the fifth position is located at a time unit after the time units corresponding to the N uplink reference signal instances and at a second specified distance from the time units corresponding to the N uplink reference signal instances; a sixth position, where the sixth position is determined based on a first offset value and a start time or an end time of a first uplink reference signal instance or any specified time between the start time and the end time, where the first uplink reference signal instance belongs to the N uplink reference signal instances; a seventh position, where the seventh position is a sending time of a specific PUSCH resource, and the specific PUSCH resource is associated with the N uplink reference signal instances; or an eighth position, where the eighth position is a time indicated by a network, prescribed in a protocol, or configured by a higher layer.

In an implementation, the end point of the time window includes at least one of the following: a ninth position, where the ninth position is a receiving time of a RRC release message; or a tenth position, where the tenth position is determined based on a second offset value and a start time or an end time of a second uplink reference signal instance or any specified time between the start time and the end time, where the second uplink reference signal instance belongs to the N uplink reference signal instances.

In an implementation, a SCS corresponding to a slot or a symbol in the first time window meets any one of the following: the subcarrier spacing SCS corresponding to the slot or the symbol is consistent with an SCS corresponding to the uplink reference signal; the SCS corresponding to the slot or the symbol is consistent with an SCS corresponding to an initial BWP; and the SCS corresponding to the slot or the symbol is consistent with an SCS corresponding to a specific search space, where the specific search space is used to search for the first PDCCH.

In an implementation, the target feedback information includes at least one of the following: first information, used to indicate presence or absence of a configuration update of the uplink reference signal; second information, used to indicate presence or absence of a TA update; third information, used to indicate whether the network-side device successfully receives or measures the uplink reference signal; fourth information, used to instruct the terminal to enter or not to enter a connected state; fifth information, used to indicate a TA update value or a TA variation; a TA validity parameter or update information of a TA validity parameter; or a configuration of the uplink reference signal or a configuration update of the uplink reference signal.

In an implementation, the processor 710 is further configured to perform at least one of the following: indicating, to the network-side device, that the terminal starts or does not start the first time window; receiving first indication information sent by the network-side device, where the first indication information is used to instruct the terminal to start or not to start the first time window; or determining, based on a target DRX configuration, to start or not to start the first time window, where the target DRX configuration is a DRX configuration in the inactive state or the idle state.

In an implementation, the step of indicating, by the processor 710 to the network-side device, that the terminal starts or does not start the first time window includes at least one of the following: indicating, by the terminal to the network-side device by using sequence information of the uplink reference signal, that the terminal starts or does not start the first time window; indicating, by the terminal to the network-side device by using a mapping mode of the uplink reference signal, that the terminal starts or does not start the first time window; indicating, by the terminal to the network-side device by using a specific PUSCH resource corresponding to the uplink reference signal, that the terminal starts or does not start the first time window; or indicating, by the terminal to the network-side device by using a SDT mode, that the terminal starts or does not start the first time window.

In an implementation, the first indication information is transmitted by using a paging message or system information.

In an implementation, the step of determining, by the processor 710 based on a target DRX configuration, to start or not to start the first time window includes at least one of the following: if the first time window is within on duration of the target DRX configuration, starting, by the terminal, the first time window; in a case that a time difference between the first time window and a target PO does not exceed a first threshold, starting, by the terminal, the first time window, where the target PO is a PO nearest to the first time window among a plurality of POs; or in a case that a difference between the first time window and a transmission time when the terminal last transmits a physical signal and/or a physical channel does not exceed a second threshold, starting, by the terminal, the first time window.

In an implementation, the processor 710 is further configured to perform at least one of the following in a case that the target feedback information sent by the network-side device is not received within the first time window: resending the uplink reference signal to the network-side device; initiating an SDT process, where the SDT process is used to request to update a configuration of the uplink reference signal and/or a TA validity parameter; entering a connected state by initiating a random access procedure; or ignoring a reception result, where the reception result is that the terminal does not receive, within the first time window, the target feedback information sent by the network-side device.

In an implementation, the processor 710 is further configured to perform either of the following within an overlapping time in a case that there is an overlap between the first time window and a PO: monitoring only a paging PDCCH; and monitoring the paging PDCCH and the first PDCCH.

In an implementation, a target configuration is a dedicated configuration dedicated to receiving the target feedback information, or a target configuration is a shared configuration for receiving the target feedback information and/or other information than the target feedback information, where the target configuration includes at least one of the following: the configuration of the first time window; a configuration of a search space associated with the first PDCCH; a configuration of the CORESET associated with the first PDCCH; or a configuration of an RNTI associated with the first PDCCH.

In an implementation, the radio frequency unit 701 is further configured to receive cell list information sent by the network-side device, where the cell list information includes information about at least one first cell to assist in sending the uplink reference signal when the terminal moves in the at least one first cell.

In an implementation, the cell list information includes at least one of the following: identification information of each first cell; related time information of each first cell; configuration information of a target reference signal of each first cell, where the target reference signal is used to assist the terminal in calculating an RSTD or a RSRP difference; a threshold for an RSTD between the first cells; a threshold for an RSRP difference between the first cells; a TA-related parameter of each first cell; or information about a second cell, where the second cell is a cell that is in the at least one first cell and capable of allowing a terminal camping on the second cell to send an uplink reference signal without receiving sixth information, and the sixth information is a TA command and/or a TA validity parameter of the second cell.

In this embodiment of this application, the terminal sends the uplink reference signal in the idle state or the inactive state. Therefore, a problem of high energy consumption of the terminal due to terminal positioning can be effectively alleviated. In addition, the terminal receives, based on the first time window, the target feedback information sent by the network-side device, and/or monitors the first PDCCH related to the target feedback information, so that the terminal can maintain validity of the TA or validity of the configuration of the uplink reference signal in the positioning process, thereby further ensuring positioning/sensing performance.

It may be understood that in addition to the foregoing implementations, in this embodiment, the processor 710 in the terminal 700 may be further configured to: in a case that a terminal completes cell reselection or camped cell handover during sending of an uplink reference signal in an idle state or an inactive state, perform a first behavior, where the first behavior is related to the sending, releasing, or updating of the uplink reference signal, and the uplink reference signal includes an uplink positioning reference signal and/or an uplink sensing signal.

In an implementation, the first behavior includes at least one of the following: initiating an SDT process, where the SDT process is used to request to update a configuration of the uplink reference signal and/or a TA validity parameter; releasing a reference signal resource corresponding to the uplink reference signal; entering a connected state by initiating a random access procedure; sending a first message based on a 4-step random access process, where the first message is used to request a network-side device to perform a TA update; sending the uplink reference signal based on a TA of a last cell; or performing TA compensation based on an RSTD between a target cell and the last cell, and sending the uplink reference signal based on a compensated TA.

In an implementation, in a case that any condition in a first condition group is met, the first behavior includes at least one of the initiating an SDT process, the releasing a reference signal resource corresponding to the uplink reference signal, or the entering a connected state by initiating a random access procedure, where the condition in the first condition group includes at least one of the following: a TA validity condition of the last cell is invalid; the RSTD between the target cell and the last cell exceeds a third threshold; an RSRP difference between the target cell and the last cell exceeds a fourth threshold; a time of camping on the target cell by the terminal exceeds a fifth threshold; a downlink timing difference between the target cell and the last cell exceeds a sixth threshold; or the target cell does not allow a terminal camping on the target cell to send an uplink reference signal without receiving sixth information, where the sixth information is a TA command and/or a TA validity parameter of the target cell.

In an implementation, in a case that no condition in the first condition group is met, the first behavior includes either of the following: sending the uplink reference signal based on the TA of the last cell; and performing the TA compensation based on the RSTD between the target cell and the last cell, and sending the uplink reference signal based on the compensated TA.

In an implementation, in a case that a second message sent by the network-side device is received, the processor 710 is further configured to perform a TA update based on TA update information carried in the second message.

In an implementation, the TA update information includes at least one of the following: a TA variation; or a TA validity parameter.

In an implementation, in a case that a second message is received and that the terminal is in the idle state or inactive state, the processor 710 is further configured to perform at least one of the following: ignoring scheduling information carried in the second message, where the scheduling information is used to schedule a third message; ignoring other information in the second message than TA update information, and remaining in the idle state or inactive state; ignoring a procedure for sending the third message; or ignoring a procedure for receiving a fourth message, where the fourth message corresponds to the third message.

In an implementation, the processor 710 is further configured to receive cell list information sent by the network-side device, where the cell list information includes information about at least one first cell to assist in sending the uplink reference signal when the terminal moves in the at least one first cell.

In an implementation, the cell list information includes at least one of the following: identification information of each first cell; related time information of each first cell; configuration information of a target reference signal of each first cell, where the target reference signal is used to assist the terminal in calculating an RSTD or a RSRP difference; a threshold for an RSTD between the first cells; a threshold for an RSRP difference between the first cells; a TA-related parameter of each first cell; or information about a second cell, where the second cell is a cell that is in the at least one first cell and capable of allowing a terminal camping on the second cell to send an uplink reference signal without receiving sixth information, and the sixth information is a TA command and/or a TA validity parameter of the second cell.

In this embodiment of this application, the terminal sends the uplink reference signal in the idle state or the inactive state. Therefore, a problem of high energy consumption of the terminal due to terminal positioning can be effectively alleviated. In addition, the terminal performs the first behavior related to the sending, releasing, or updating of the uplink reference signal, thereby ensuring validity of the TA or validity of the configuration of the uplink reference signal after the terminal completes the cell reselection or camped cell handover.

An embodiment of this application further provides a non-transitory readable storage medium. The non-transitory readable storage medium stores a program or instructions. When the program or instructions are executed by a processor, each process of the foregoing positioning method embodiment is implemented, with the same technical effect achieved. To avoid repetition, details are not described herein again.

The processor is a processor in the terminal in the foregoing embodiment. The non-transitory readable storage medium includes a non-transitory computer-readable storage medium, for example, a computer read-only memory (ROM).

In addition, an embodiment of this application provides a chip. The chip includes a processor and a communication interface. The communication interface is coupled to the processor. The processor is configured to execute a program or instructions on a network-side device to implement each process of the foregoing positioning method embodiment, with the same technical effect achieved. To avoid repetition, details are not described herein again.

It should be understood that the chip provided in this embodiment of this application may also be referred to as a system-level chip, a system chip, a chip system, a system-on-chip, or the like.

An embodiment of this application further provides a computer program product. The computer program product includes a processor, a memory, and a program or instructions that are stored in the memory and executable on the processor. When the program or instructions are executed by the processor, each process of the foregoing positioning method embodiment is implemented, with the same technical effect achieved. To avoid repetition, details are not described herein again.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary general hardware platform, and certainly may alternatively be implemented by using hardware. However, in most cases, the former is a preferred implementation. Based on such an understanding, the technical solutions of this application essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing embodiments. The foregoing embodiments are merely illustrative rather than restrictive. Inspired by this application, a person of ordinary skill in the art may develop many other manners without departing from principles of this application and the protection scope of the claims, and all such manners fall within the protection scope of this application.

What is claimed is:

1. A positioning method, performed by a terminal, comprising:

in a case that the terminal completes cell reselection or camped cell handover during sending of an uplink reference signal in an idle state or an inactive state, sending the uplink reference signal based on a timing advance (TA) of a last cell; or performing TA compensation based on a reference signal time difference (RSTD) between a target cell and the last cell, and sending the uplink reference signal based on a compensated TA, wherein the uplink reference signal comprises an uplink positioning reference signal and/or an uplink sensing signal.

2. The method according to claim 1, wherein in a case that no condition in a first condition group is met, either of the following behavior is performed:

sending the uplink reference signal based on the TA of the last cell; or performing the TA compensation based on the RSTD between the target cell and the last cell, and sending the uplink reference signal based on the compensated TA.

3. The method according to claim 1, wherein the method further comprises:

receiving, by the terminal, cell list information sent by a network-side device, wherein the cell list information comprises information about at least one first cell to assist in sending the uplink reference signal when the terminal moves in the at least one first cell; wherein the cell list information comprises at least one of the following:

identification information of each first cell;

related time information of each first cell;

configuration information of a target reference signal of each first cell, wherein the target reference signal is used to assist the terminal in calculating an RSTD or a reference signal received power (RSRP) difference;

a threshold for an RSTD between the first cells;

a threshold for an RSRP difference between the first cells;

a TA-related parameter of each first cell; or information about a second cell, wherein the second cell is a cell that is in the at least one first cell and capable of allowing a terminal camping on the second cell to send an uplink reference signal without receiving sixth information, and the sixth information is a TA command and/or a TA validity parameter of the second cell.

4. The method according to claim 2, wherein a condition in the first condition group comprises :

the RSTD between the target cell and the last cell exceeds a third threshold.

5. The method according to claim 1, wherein the RSTD indicates a time difference in downlink (DL) reference signal timing measurement.

6. The method according to claim 1, wherein the compensated TA is twice the RSTD.

7. The method according to claim 1, wherein the sending the uplink reference signal based on the TA of the last cell comprises:

in a case that the RSTD between the target cell and the last cell does not exceed a third threshold, sending the uplink reference signal based on the TA of the last cell.

8. A terminal, comprising a processor, a memory, and a program or instructions that are stored in the memory and executable on the processor, wherein the program or instructions, when executed by the processor, cause the terminal to perform:

in a case that the terminal completes cell reselection or camped cell handover during sending of an uplink reference signal in an idle state or an inactive state, sending the uplink reference signal based on a timing advance (TA) of a last cell; or performing TA compensation based on a reference signal time difference (RSTD) between a target cell and the last cell, and sending the uplink reference signal based on a compensated TA, wherein the uplink reference signal comprises an uplink positioning reference signal and/or an uplink sensing signal.

9. The terminal according to claim 8, wherein in a case that no condition in a first condition group is met, either of the following behavior is performed:

sending the uplink reference signal based on the TA of the last cell; or performing the TA compensation based on the RSTD between the target cell and the last cell, and sending the uplink reference signal based on the compensated TA.

10. The terminal according to claim 9, wherein a condition in the first condition group comprises:

the RSTD between the target cell and the last cell exceeds a third threshold.

11. The terminal according to claim 8, wherein the RSTD indicates a time difference in downlink (DL) reference signal timing measurement.

12. The terminal according to claim 8, wherein the compensated TA is twice the RSTD.

13. The terminal according to claim 8, wherein the program or instructions, when executed by the processor, cause the terminal to perform:

in a case that the RSTD between the target cell and the last cell does not exceed a third threshold, sending the uplink reference signal based on the TA of the last cell.

14. The terminal according to claim 8, wherein the program or instructions, when executed by the processor, cause the terminal to further perform:

receiving cell list information sent by a network-side device, wherein the cell list information comprises information about at least one first cell to assist in sending the uplink reference signal when the terminal moves in the at least one first cell; wherein the cell list information comprises at least one of the following:

identification information of each first cell;

related time information of each first cell;

configuration information of a target reference signal of each first cell, wherein the target reference signal is used to assist the terminal in calculating an RSTD or a reference signal received power (RSRP) difference;

a threshold for an RSTD between the first cells;

a threshold for an RSRP difference between the first cells;

a TA-related parameter of each first cell; or information about a second cell, wherein the second cell is a cell that is in the at least one first cell and capable of allowing a terminal camping on the second cell to send an uplink reference signal without receiving sixth information, and the sixth information is a TA command and/or a TA validity parameter of the second cell.

15. A non-transitory readable storage medium, wherein the non-transitory readable storage medium stores a program or instructions, and the program or instructions, when executed by a processor of a terminal, cause the terminal to perform:

in a case that the terminal completes cell reselection or camped cell handover during sending of an uplink reference signal in an idle state or an inactive state, sending the uplink reference signal based on a timing advance (TA) of a last cell; or performing TA compensation based on a reference signal time difference (RSTD) between a target cell and the last cell, and sending the uplink reference signal based on a compensated TA, wherein the uplink reference signal comprises an uplink positioning reference signal and/or an uplink sensing signal.

16. The non-transitory readable storage medium according to claim 15, wherein in a case that no condition in a first condition group is met, either of the following behavior is performed:

sending the uplink reference signal based on the TA of the last cell; or performing the TA compensation based on the RSTD between the target cell and the last cell, and sending the uplink reference signal based on the compensated TA.

17. The non-transitory readable storage medium according to claim 16, wherein a condition in the first condition group comprises:

the RSTD between the target cell and the last cell exceeds a third threshold.

18. The non-transitory readable storage medium according to claim 15, wherein the RSTD indicates a time difference in downlink (DL) reference signal timing measurement; or, the compensated TA is twice the RSTD.

19. The non-transitory readable storage medium according to claim 15, wherein the program or instructions, when executed by the processor, cause the terminal to perform:

in a case that the RSTD between the target cell and the last cell does not exceed a third threshold, sending the uplink reference signal based on the TA of the last cell.

20. The non-transitory readable storage medium according to claim 15, wherein the program or instructions, when executed by the processor, cause the terminal to further perform:

receiving cell list information sent by a network-side device, wherein the cell list information comprises information about at least one first cell to assist in sending the uplink reference signal when the terminal moves in the at least one first cell; wherein the cell list information comprises at least one of the following:

identification information of each first cell;

related time information of each first cell;

configuration information of a target reference signal of each first cell, wherein the target reference signal is used to assist the terminal in calculating an RSTD or a reference signal received power (RSRP) difference;

a threshold for an RSTD between the first cells;

a threshold for an RSRP difference between the first cells;

a TA-related parameter of each first cell; or information about a second cell, wherein the second cell is a cell that is in the at least one first cell and capable of allowing a terminal camping on the second cell to send an uplink reference signal without receiving sixth information, and the sixth information is a TA command and/or a TA validity parameter of the second cell.

* * * * *